(12) United States Patent  (10) Patent No.: US 9,276,753 B2
Hsien  (45) Date of Patent: Mar. 1, 2016

(54) SYSTEM AND METHOD FOR DATA AUTHENTICATION AMONG PROCESSORS

(71) Applicant: HTC Corporation, Taoyuan (TW)

(72) Inventor: Chao-Chung Hsien, Taoyuan (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/686,752

(22) Filed: Apr. 14, 2015

(65) Prior Publication Data

US 2015/0222438 A1    Aug. 6, 2015

Related U.S. Application Data

(62) Division of application No. 13/674,068, filed on Nov. 11, 2012, now Pat. No. 9,054,874.

(60) Provisional application No. 61/565,955, filed on Dec. 1, 2011.

(51) Int. Cl.
| | |
|---|---|
| G06F 11/30 | (2006.01) |
| H04L 9/32 | (2006.01) |
| G06F 21/57 | (2013.01) |
| G06F 21/60 | (2013.01) |
| H04L 9/08 | (2006.01) |
| H04L 9/00 | (2006.01) |

(52) U.S. Cl.
CPC ............ *H04L 9/3247* (2013.01); *G06F 21/575* (2013.01); *G06F 21/606* (2013.01); *H04L 9/0866* (2013.01); *H04L 9/3226* (2013.01); *H04L 9/00* (2013.01); *H04L 9/0813* (2013.01)

(58) Field of Classification Search
CPC ... H04L 9/3247; H04L 9/0866; H04L 9/3226; H04L 9/0813; H04L 9/00; G06F 21/606; G06F 21/575
See application file for complete search history.

(56) References Cited

U.S. PATENT DOCUMENTS

| | | | |
|---|---|---|---|
| 6,799,197 B1 | 9/2004 | Shetty | |
| 6,975,727 B1 * | 12/2005 | Vandergeest | H04L 9/0891 380/273 |
| 7,051,206 B1 * | 5/2006 | Giest | G06Q 20/3674 380/282 |
| 7,552,333 B2 * | 6/2009 | Wheeler | G06F 21/32 380/282 |
| 8,527,618 B1 | 9/2013 | Wiese | |
| 2002/0112161 A1 | 8/2002 | Thomas | |
| 2004/0111331 A1 * | 6/2004 | Yano | G06Q 40/04 705/37 |
| 2005/0097316 A1 * | 5/2005 | Kim | H04L 9/3255 713/163 |

(Continued)

FOREIGN PATENT DOCUMENTS

| | | |
|---|---|---|
| CN | 101379506 A | 3/2009 |
| EP | 0 725 512 A2 | 8/1996 |

OTHER PUBLICATIONS

Office action mailed on Apr. 30, 2015 for the U.S. Appl. No. 13/682,739, filed Nov. 21, 2012, p. 1-41.

(Continued)

*Primary Examiner* — Krisna Lim
(74) *Attorney, Agent, or Firm* — Winston Hsu; Scott Margo

(57) ABSTRACT

The invention discloses system and method for data authentication among processors. The method comprises: generating a first key, by a first processor, according to a first identification data and a first algorithm; generating a first digest, by the first processor, according to data to be transmitted, the first identification data and a second algorithm; generating a digital signature, by the first processor, according to the first key, the first digest and a third algorithm; and transmitting the data and the digital signature from the first processor to a second processor.

6 Claims, 6 Drawing Sheets

(56) References Cited

U.S. PATENT DOCUMENTS

| | | |
|---|---|---|
| 2008/0184218 A1 | 7/2008 | Largman |
| 2008/0189550 A1 | 8/2008 | Roundtree |
| 2010/0005304 A1* | 1/2010 | Maruyama .......... G06Q 20/045 713/175 |
| 2010/0050241 A1 | 2/2010 | Yan |
| 2010/0290076 A1 | 11/2010 | Itoh |
| 2011/0274273 A1 | 11/2011 | Fiske |
| 2012/0294445 A1 | 11/2012 | Radutskiy |

OTHER PUBLICATIONS

Office action mailed on May. 29, 2015 for the China application No. 201210511241.3, filing date Dec. 3, 2012, p. 1-6.

Office action mailed on Jul. 27, 2015 for the U.S. Appl. No. 13/682,752, filed Nov. 21, 2012, p. 1-16.

Yandji et al., "Research on a Normal File Encryption and Decryption," Computer and Management (CAMAN), 2011 IEEE International Conference on Year: 2011, pp. 1-4.

Zugenmaier et al., "Transparent Encryption for External Storage Media with Key Management Adapted to Mobile Use," Annual Computer Security Applications Conference, 2009 IEEE computer society, ACSAC.2009.38 Year: 2009 pp. 333-339.

Notice of Allowance mailed on Sep. 14, 2015 for the U.S. Appl. No. 13/682,739, filed Nov. 21, 2012, p. 1-18.

* cited by examiner

SYSTEM AND METHOD FOR DATA AUTHENTICATION AMONG PROCESSORS

CROSS REFERENCE TO RELATED APPLICATIONS

This is a division of U.S. application Ser. No. 13/674,068 filed on Nov. 11, 2012, which claims the benefit of U.S. Provisional No. 61/565,955 filed on Dec. 1, 2011. The above-mentioned applications are included in their entirety herein by reference.

BACKGROUND OF THE INVENTION

1. Field of the Invention

The present invention relates to system and method for data authentication among processors, and more particularly, to system and method for authenticating data transmission between processors with digital signature.

2. Description of the Prior Art

Generally, an electronic device comprises a plurality of processors, and each processor is responsible for some specific tasks in order to control operations of the electronic device. For example, a smart phone may comprise a main processor, and a radio frequency processor. The main processor is for executing an operating system and some application programs in order to provide functions of the operating system and the application programs to a user. The radio frequency processor is for receiving and transmitting wireless signals in order to make communication with another electronic device. The main processor and the radio frequency processor are coupled to each other by a data bus, and data sent from the main processor to the radio frequency processor via the data bus may be monitored or changed by an external device coupled to the data bus, such that data transmission between the main processor and the radio frequency processor is not secure. The electronic device of the prior art does not have any authentication mechanism to effectively prevent the data transmitted between processors from being monitored or changed.

SUMMARY OF THE INVENTION

An embodiment of the invention discloses a method for data authentication among a first processor and a second processor. The method comprises: generating a first key, by the first processor, according to a first identification data and a first algorithm; generating a first digest, by the first processor, according to data to be transmitted, the first identification data and a second algorithm; generating a digital signature, by the first processor, according to the first key, the first digest and a third algorithm; and transmitting the data and the digital signature from the first processor to the second processor.

Another embodiment of the invention discloses a method for data authentication among a first processor and a second processor. The method comprises: generating a first authentication data, by the first processor, according to a first identification data stored within the first processor and the data to be transmitted; transmitting the data to be transmitted and the first authentication data from the first processor to the second processor; performing authentication of the data to be transmitted, by the second processor, according to the first authentication data and a second identification data corresponding to the second processor; and performing operation corresponding to the data to be transmitted, by the secondary processor, in response to the authentication being confirmed.

Yet in another embodiment of the invention discloses a system for performing data authentication. The system comprises: a first processor, configured to generate an authentication data corresponding to data to be transmitted according to an identification data in a secure domain, the identification data being stored in a memory space that can only be accessed by the secure domain; a transmission interface unit, configured to transmit the authentication data and the data to be transmitted from the first processor; and a second processor, configured to receive the authentication data and the data to be transmitted through the transmission interface unit, perform an authentication of the data to be transmitted according to the authentication data, and perform operation corresponding to the data to be transmitted in response to the authentication being confirmed.

These and other objectives of the present invention will no doubt become obvious to those of ordinary skill in the art after reading the following detailed description of the preferred embodiment that is illustrated in the various figures and drawings.

DETAILED DESCRIPTION

The invention discloses system and method for providing data authentication among at least two processors in an electronic device. Sensitive data that should verified by authorized parties (processors, processing units, electronic components, and/or devices) is protected by authentication data generated prior to transmission. In response to a request for accessing such data, the processor that hold the sensitive data may generate the authentication data according to the data and identification data corresponding to authorized processor. The data is then sent to the requesting processor along with authentication data. To prove the security of the data, the requesting processor would confirm the authentication data prior to performing operations corresponding to the data. If the processor sending out the data is the authorized processor, the authentication data can be confirmed with the requesting processor's identification data. If the processor sending out the data is not authorized, the authentication data thus cannot be confirmed since the identification data would not match. In this way, insecure data can be identified and prevented from processing.

Figure 1:
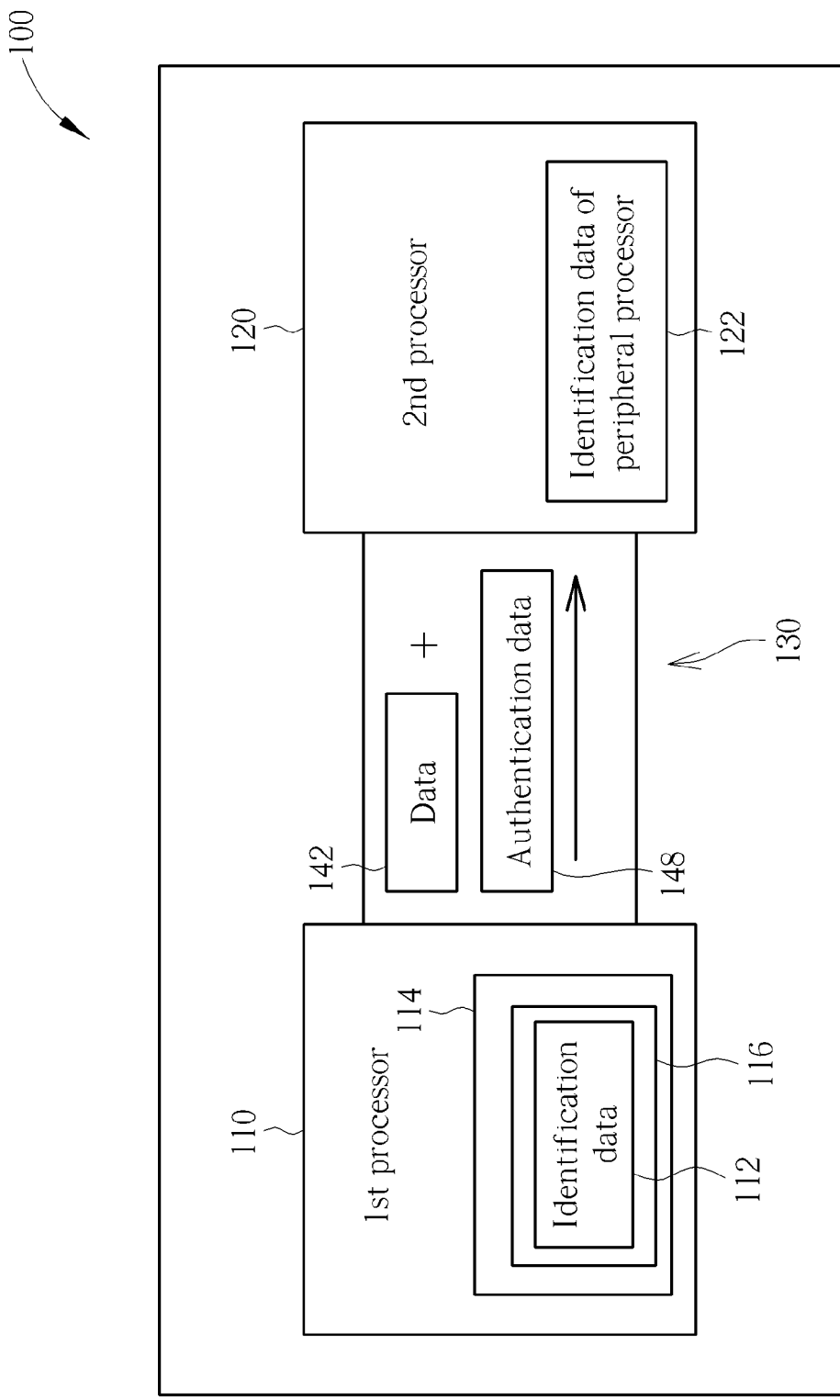
FIG. 1 is a diagram illustrating a data transmission system according to an embodiment of the invention.

Please refer to FIG. 1, which depicts a block diagram of a data authentication system 100 according to an embodiment of the present invention. The data authentication system may be implemented in an electronic device, such as personal computer, desktop computer, laptop computer, portable devices, and/or other suitable devices. The data authentication system 100 comprises, among others, a first processor 110, a second processor 120 and a transmission interface unit 130. The first processor 110 electrically communicates with the second processor 120 via the transmission interface unit 130. In one embodiment of the invention, the first processor 110 may transmit data 142 to the second processor 120 in response to a request from the second processor 120. In general, the data 142 may be any type of data that can be used and accessed by the first processor 110 and the second processor 120 without any security mechanism. However, some sensitive data should not be accessed without authentication of its source for security reasons. For example, SIM-lock data, electronic payment data, and/or other types of data that require secure processing.

To provide authentication of sensitive data, the first processor 110 of the embodiment comprises a secure domain 114 configured to provide data authentication. The secure domain 114 is separated from normal domain wherein the operating system is executed (not shown), and is allocated with a secure memory 116 for storing data associated with data authentication. The secure domain 114 is invisible to the user and cannot be accessed by general processes running in normal domain. Similarly, data stored in the secure memory 116 cannot be accessed by general processes executed in normal domain. In one embodiment of the invention, the secure memory 116 may store information associated with processors/processing units authorized to access and process data 142, for example the second processor 120. In one embodiment of the invention, the secure memory 116 may store identification data 112 corresponding to the second processor 120. Upon receiving requests for transmitting data 142 which should be authorized, the first processor 112 may process the data 142 in the secure domain 114 prior to transmitting the data 142 to the second processor 120. The secure domain 114 may be configured to generate authentication data 148 based on a predefined algorithm according to the data 142 and the identification data 112. The data 142 protected with the authentication data 148 is transmitted to the second processor 120 via the transmission interface unit 130.

Upon receiving the data 142 and the authentication data 148, the second processor 120 would not access the data 142 unless the authentication data 148 is successfully confirmed. The second processor 120 may confirm the authentication data 148 based on a predefined algorithm according to its own identification data 122. In the case that the second processor 120 is the intended or authorized processing unit, the authentication data 148 can be confirmed with identification information of itself. Once the authentication data 148 is confirmed, the second processor 120 may access the data 142 and perform operation(s) corresponding to the data 142. In the case that the second processor 120 is not the intended or authorized processing unit, the data 142 would be discarded. As a result, sensitive data from unknown source can be detected and avoided from processing.

In one embodiment of the invention, the first processor 110 may retrieve information from the second processor 120, for example processor ID, fuse data, MAC address, and/or other unique information corresponding to the second processor. Furthermore, the first processor 110 and the second processor may be configured to perform same pair of predefined authentication algorithms for generating and confirming the authentication data 148 respectively. In yet another embodiment of the invention, the secure domain 114 is implemented as a secure bootloader. In further embodiments of the invention, the secure domain 114 is implemented by TrustZone technology developed by ARM.

In one embodiment of the invention, the data authentication system is implemented in an electronic device, the first processor 110 is a host processor and the second processor is a peripheral processor. In another embodiment of the invention, the data transmission system is a mobile device, the first processor is an application processor and the second processor is a radio frequency processor. Furthermore, the first processor 110 and the second processor 120 may be implemented as separate chips or integrated in a single chip. The transmission interface unit 130 may be implemented in various protocols, such as data bus, PCIE, USB, SDIO and/or other suitable protocols. However the invention is not limited to above embodiments.

Figure 2:
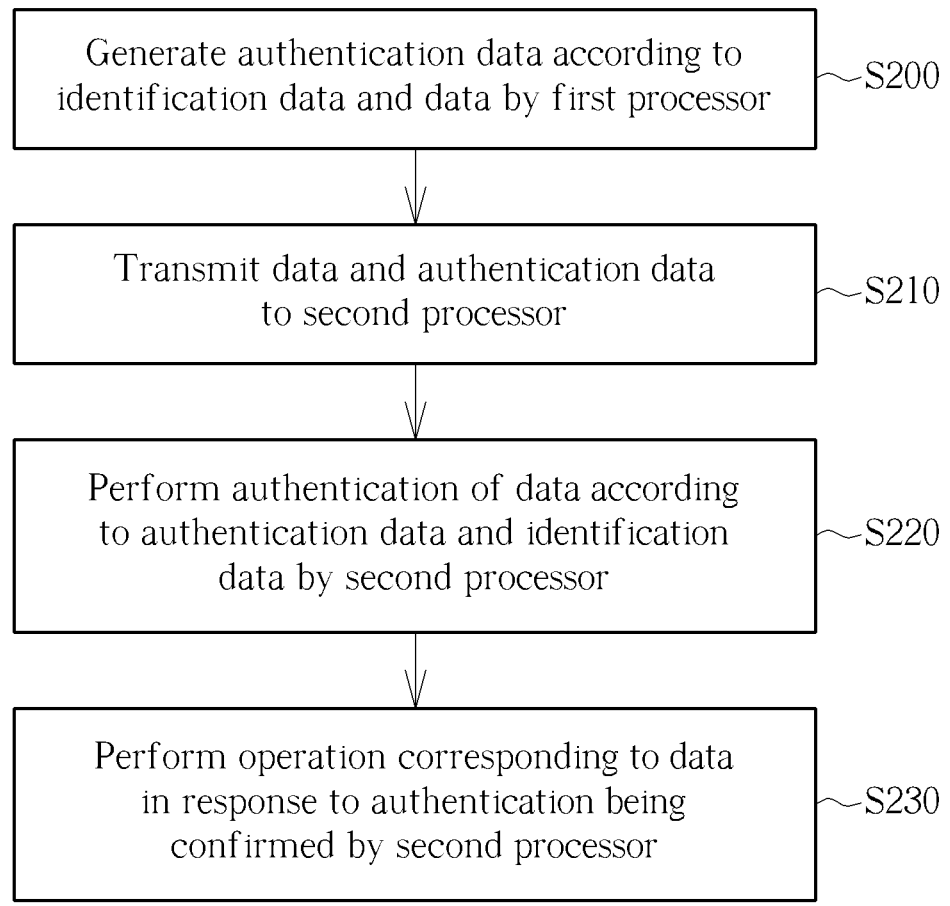
FIG. 2 is a diagram illustrating a method for data authentication according to an embodiment of the invention.

Next please refer to FIG. 2 with reference to FIG. 1. FIG. 2 illustrates a method for data authentication according to an embodiment of the invention. The method can be applied to the data authentication system of FIG. 1. The method starts with generating authentication data 148 according to data to be transmitted 142 and identification data 112 corresponding to authorized receiving processor (S200). The first processor 110 may obtain the identification data 112 during manufacturing stage or retrieve from the authorized processor in advance, for example the second processor 120 in this embodiment. As shown in FIG. 1, the first processor 110 may generate the authentication data 148 in the secure domain 114, and the identification data 112 is stored in a secure memory 116 which can only be accessed in the secure domain 114. Then in step S210, the data 142 and the authentication data 148 is transmitted together to the second processor 120 for providing protection to the data 142. The data 142 and the authentication data 148 is stored/transmitted in a way that the data 142 would not be processed unless the authentication data 148 is confirmed first.

Upon receiving the data 142 and the authentication data 148, the second processor 120 performs authentication according to the authentication data 148 and identification data 122 of its own as shown in step S220. The authentication data 148 can be confirmed if the identification data 122 of the second processor 120 matches the identification data 112 used for generating the authentication data 148. In response to the authentication data 148 is confirmed, the second processor 120 may access data 142 and perform operation corresponding to the data 142. For example, if the data 142 is SIM-lock data, the second processor 120 may unlock the SIM card to initiate communication with the service provider. In this embodiment, if the second processor 120 fails to confirm the authentication data 148, the data 142 will be discarded without further processing. Failing to confirm the authentication data 148 means the data 142 is not generated from a reliable source and therefore should be discarded.

Figure 3:
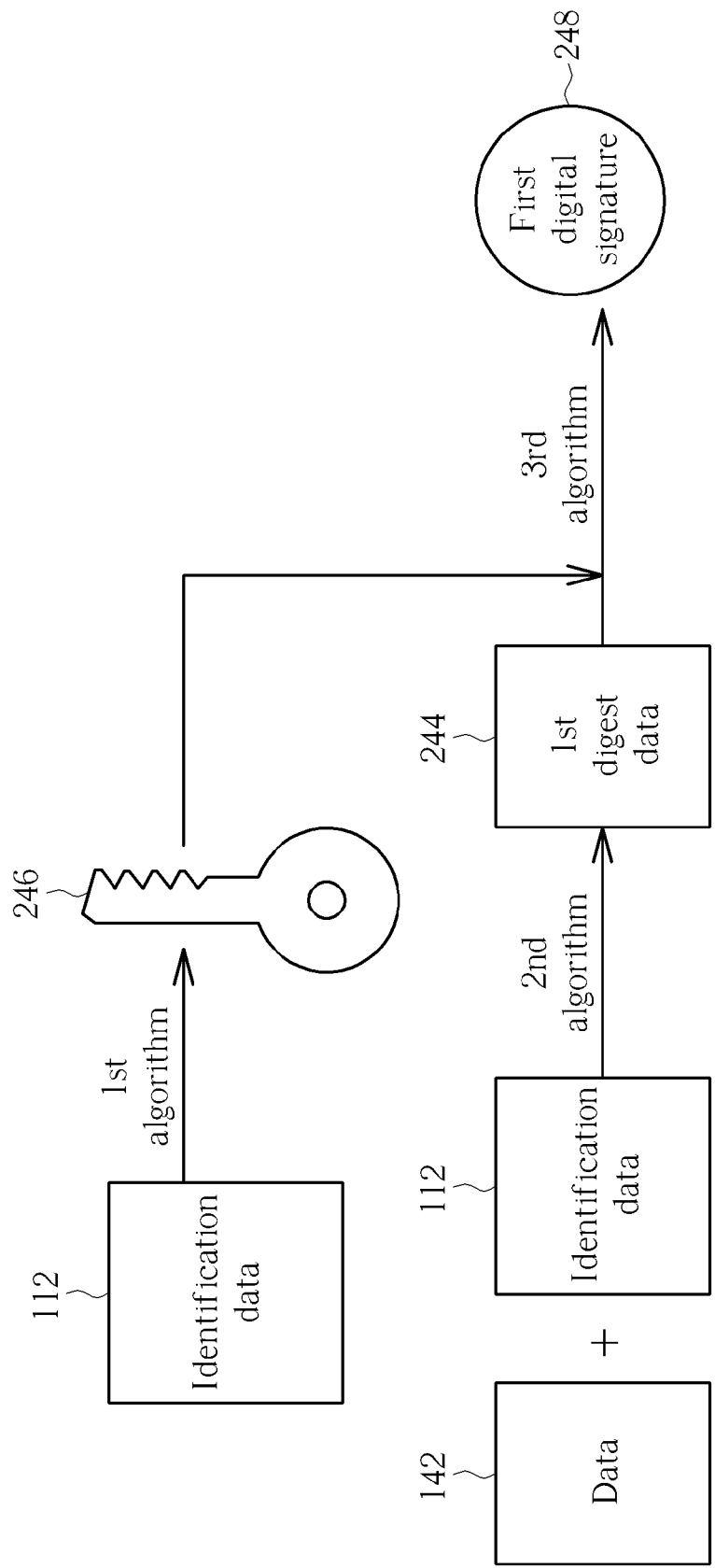
FIG. 3 is a diagram illustrating a processing flow for data authentication according to an embodiment of the invention.

Next please refer to FIG. 3, which illustrates a processing flow for generating authentication data according to an embodiment of the invention. In this embodiment, the authentication data is in the form of a digital signature derived from the data and the identification data. Using the identification data as a key source and the data as digest source, the digital signature is generated by encrypting the digest with the key. In this way the digital signature can only be confirmed with one of same identity (having the identification data). The flow starts from generating a first key 246 according to the identification data 112 and a first algorithm. The identification data 112 is further processed together with the data 142 to generate a first digest 244 according to a second algorithm. Having the key 246 and the first digest 244, a first digital signature 248 is generated from them according to a third algorithm. The first algorithm, the second algorithm and the third algorithm may be any kind of known encryption/cryptographic algorithm such as secure hash algorithm (SHA); however the invention is not limited to this embodiment. Please note that the processing flow may be executed by the first processor 110 in the secure domain 114 of FIG. 1.

Figure 4:
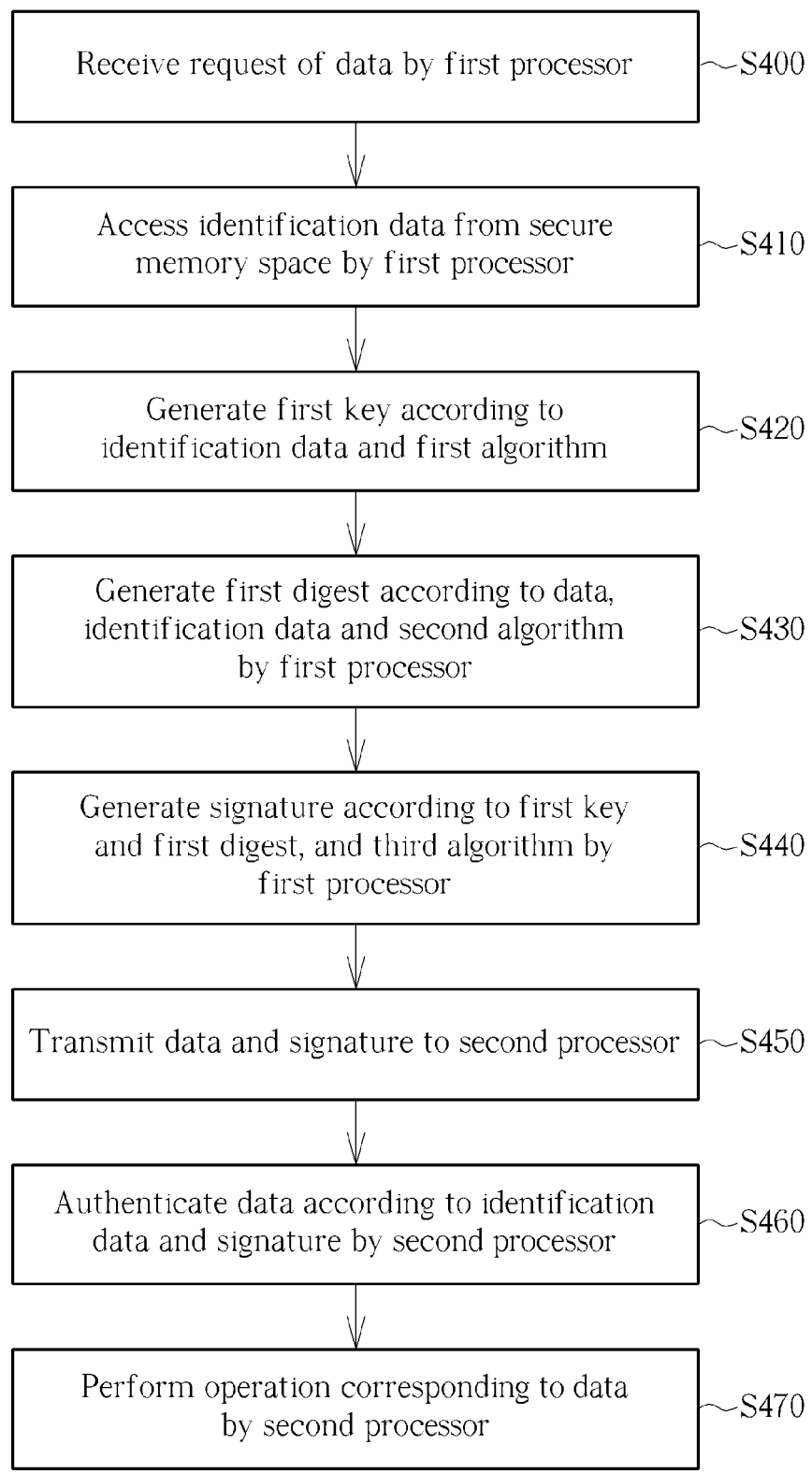
FIG. 4 is a diagram illustrating another method for data authentication according to another embodiment of the invention.

Having described the processing flow of generating authentication data, FIG. 4 discloses another method for data transmission according to an embodiment of the invention. In step S400, a first processor receives a request for accessing certain data from a second processor. The data may be sensitive data such as SIM-lock data. To protect such sensitive data, the first processor may process the data first in a secure domain, such as an authenticated bootloader or TrustZone. The first processor accesses identification data of authorized processor from a secure memory space that can only be accessed in the secure domain in step S410. Once the identification data is retrieved, the first processor generates a first key according to the identification data and a first algorithm in step S420. The first algorithm may be a predefined algorithm such as SHA256 and/or other suitable algorithm for key generation. The first key is later used for encryption of the data. The first processor then generates a first digest according to the data, identification data and a second algorithm in step S430. The second algorithm may also be a predefined algorithm and/or may be the same as the first algorithm. Next in step S440 a digital signature for protecting the data is generated by encrypting the first digest with the first key according to a third algorithm. Similarly, the third algorithm may be any kind of suitable encryption algorithm. Please note that the steps of generating the key, digest and digital signature are performed in the secure domain of the first processor. In step S450, the data along with the digital signature is transmitted to the requesting second processor.

In response to receiving the data and the digital signature, the second processor first performs authentication of the data before it can be accessed. The data is authenticated according to identification of the second processor and the digital signature in step S460. If the second processor holds the same identification data, key for decrypting the digital signature may be generated according the identification data of the second processor. In step S470 in response to the authentication is confirmed, the second processor may access the data and perform corresponding operation. In the embodiment that the data is SIM-lock data, the second processor may utilize to SIM-lock data for establishing communication with service provider.

Figure 5:
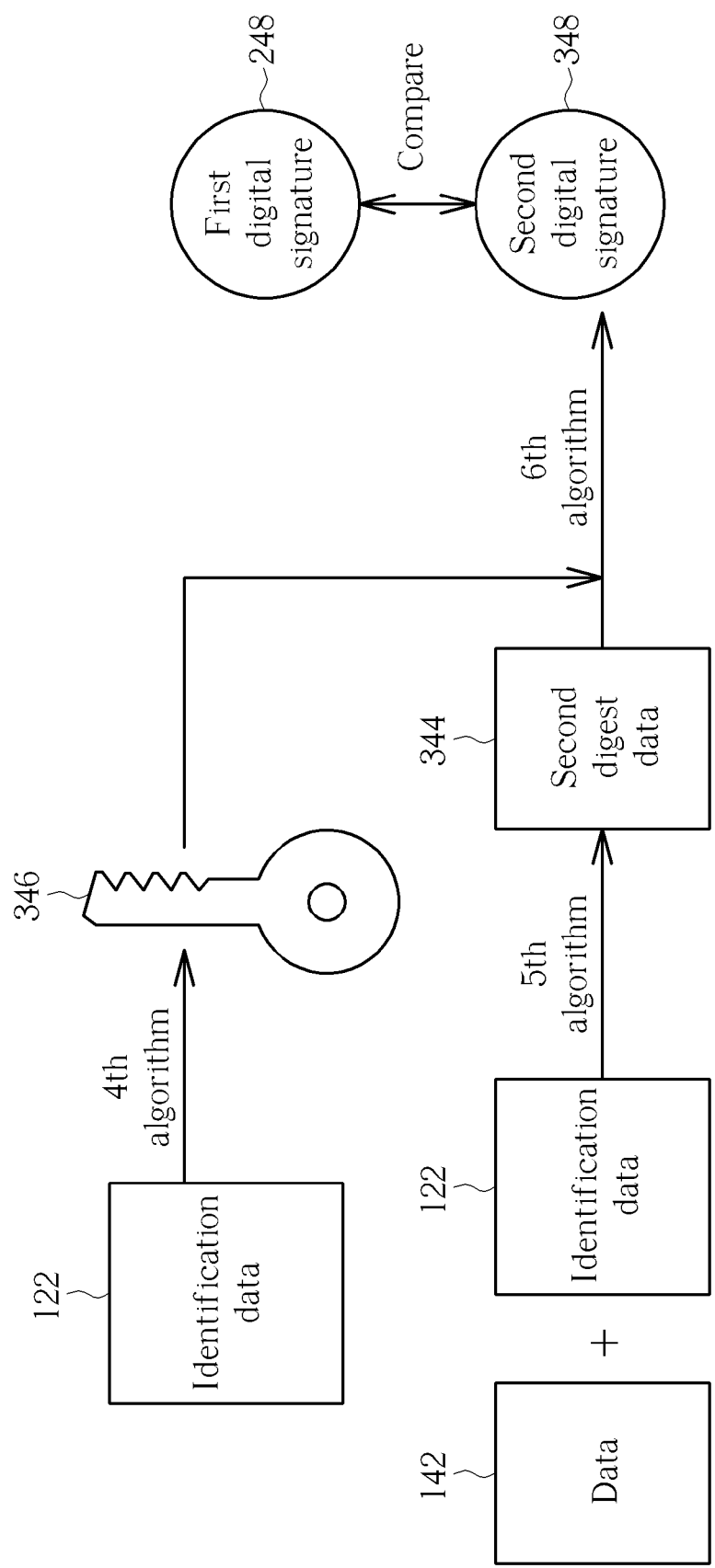
FIG. 5 is a diagram showing a processing flow for data authentication according to another embodiment of the invention.

As described above, the second processor would not access the data without confirmation of the authentication data sent together with the data. FIG. 5 illustrates a processing flow for data authentication according to an embodiment of the invention. It should be noted that the first processor and the second processor may share same pair of authentication mechanism during the manufacturing stage or by authorized installation. Therefore, both of the first processor and the second processor hold information and algorithms for authentication data generation and confirmation respectively. In this embodiment, the authentication data is confirmed by matching with a second authentication data generated by the second processor. The second processor 120 may generate the second authentication data in the form of a digital signature. Similarly, the digital signature may be derived from a key and a digest. As shown in FIG. 5 and with reference to FIG. 1, the second processor 120 generates a second key 346 from the identification data 122 according to a fourth algorithm, the forth algorithm may be the same as the first algorithm of FIG. 3. Then a second digest 344 is generated from the data 142 received and the identification data 122 by a fifth algorithm. The fifth algorithm may be the same as the second algorithm used by the first processor 110 in FIG. 3. Having derived the second key 346 and the second digest 344, a second digital digest 348 may be generated according to a sixth algorithm, which may be the same as the third algorithm of FIG. 3. The second digital digest 348 generated by the second processor 120 is then compared with the first digital signature 248 received from the first processor 110. In response to the second digital signature 348 matching the first digital signature 248, the data 142 is confirmed for safe processing. Please note that the fourth algorithm, fifth algorithm and sixth algorithm executed by the second processor 120 may be the same as the first algorithm, second algorithm and third algorithm executed by the first processor 110. These algorithms may be any suitable type of encryption/encoding algorithm, such as SHA.

Figure 6:
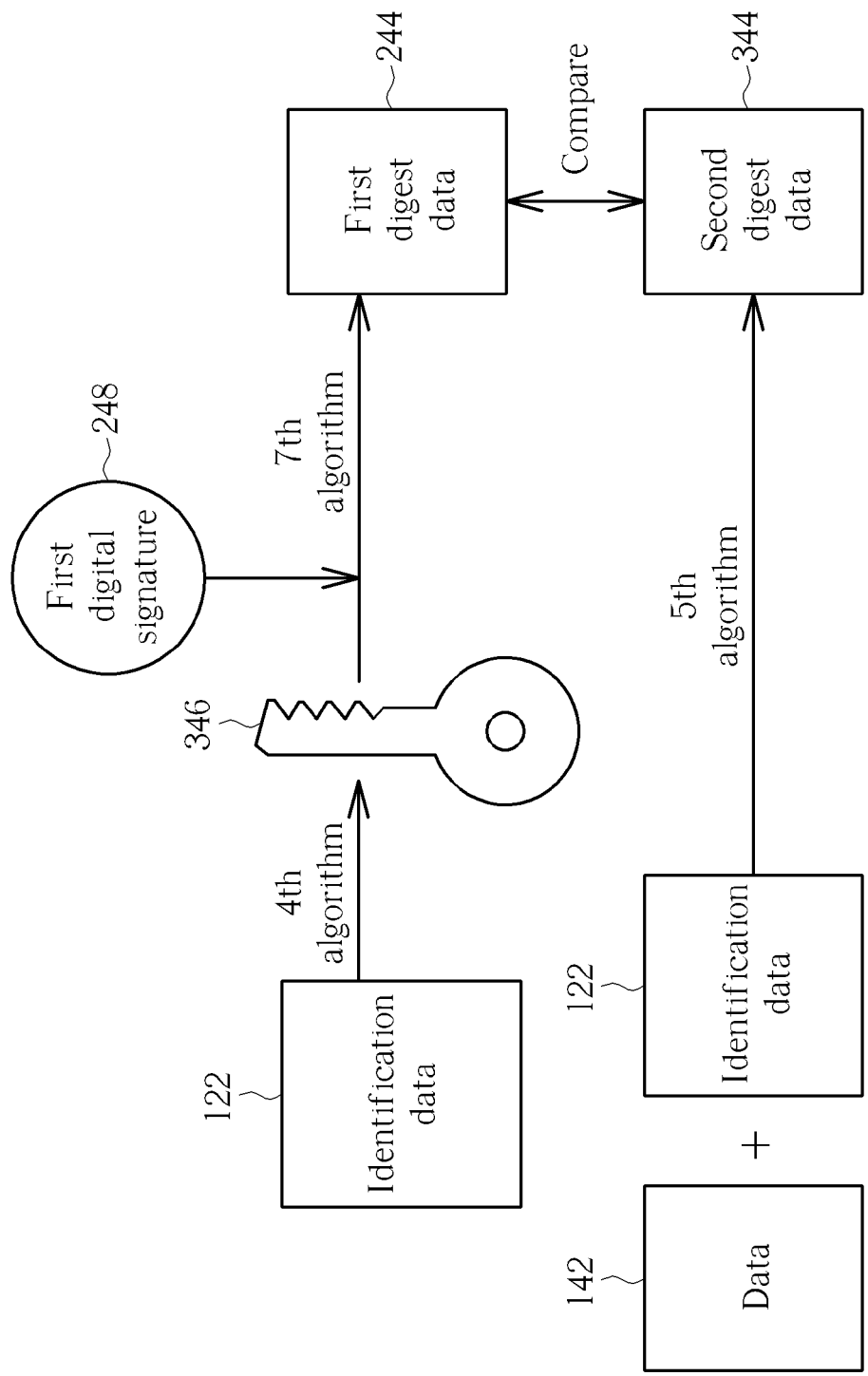
FIG. 6 is a diagram showing a processing flow for data authentication according to yet another embodiment of the invention.

FIG. 6 illustrates another embodiment of the invention for confirming authentication data. Different form the embodiment of FIG. 5, digest is generated from the authentication data 148 and from the data 142 respectively for comparison. In response to the digest derived from the authentication data 148 matching the digest derived from the data 142, the second processor 120 confirms the data 142 as authorized by reliable source. In this embodiment, identification data 122 is used to generate the second key 346 according to the fourth algorithm, similar to the embodiment of FIG. 5. However, the second key 346 is used to decrypt the authentication data 148 received from the first processor, for example the first digital signature 248 of FIG. 3 so as to obtain the first digest 244. The first digest 244 may be generated from the first digital signature 248 and the second key 346 according to a seventh algorithm. The seventh algorithm may be an algorithm inverse to the encryption algorithm used for generating the first digital signature, for example inverse to the third algorithm of FIG. 3. Then a second digest 344 is generated from received data 142 and identification data 122 of the second processor 120 according to a fifth algorithm. The first digest 244 and the second digest 344 are compared to confirm the authentication of data 142. The fourth algorithm, fifth algorithm and seventh algorithm may be any suitable algorithm for encryption and decryption, such as SHA.

In the embodiments of the invention, the first processor 110 and the second processor 120 may communicate identification data and algorithms used for authentication in between prior to the requesting and/or transmission of sensitive. The authentication processes may be executed in a secure domain and information required for use of data authentication may be stored in a secure memory accessible in the secure domain only.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data authentication among a first processor and a second processor, comprising:
   generating a first key, by the first processor, according to a first identification data and a first algorithm;
   generating a first digest, by the first processor, according to data to be transmitted, the first identification data and a second algorithm;
   generating a digital signature, by the first processor, according to the first key, the first digest and a third algorithm; and
   transmitting the data and the digital signature from the first processor to the second processor.

2. The method of claim 1, further comprising:
receiving the data to be transmitted and the digital signature by the second processor;
generating a second key, by the second processor, according to a second identification data and the forth algorithm;
generating a second digest, by the second processor, according to the data and the second identification data according to the fifth algorithm;
decrypting the first digest, by the second processor, according to the second key and the signature; and
comparing the first digest and the second digest by the second processor.

3. The method of claim 2, further comprising:
performing operation corresponding to the data in response to the comparison being successful; and
terminating the operation corresponding to the data in response to the comparison being failed.

4. The method of claim 1, further comprising:
authenticating the data to be transmitted, by the second processor, according to the digital signature and a second identification data corresponding to the second processor; and
performing operation corresponding to the data, by the second processor, in response to the authentication data being confirmed.

5. The method of claim 1, wherein the steps performed by the first processor are executed in a secure domain within the first processor.

6. The method of claim 1, further comprising:
receiving a request of the data to be transmitted from the second processor by the first processor; and
accessing the identification data from a secure memory space in response to the request.

* * * * *